(12) United States Patent
Schubert et al.

(10) Patent No.: US 10,140,720 B1
(45) Date of Patent: Nov. 27, 2018

(54) INTEGRATED OPTICAL CORRELATOR

(71) Applicant: X Development LLC, Mountain View, CA (US)

(72) Inventors: Martin Friedrich Schubert, Mountain View, CA (US); Michael Jason Grundmann, San Jose, CA (US)

(73) Assignee: X Development LLC, Mountain View, CA (US)

( * ) Notice: Subject to any disclaimer, the term of this patent is extended or adjusted under 35 U.S.C. 154(b) by 105 days.

(21) Appl. No.: 15/395,774

(22) Filed: Dec. 30, 2016

(51) Int. Cl.
*G06K 9/00* (2006.01)
*G06T 7/37* (2017.01)
(Continued)

(52) U.S. Cl.
CPC .............. *G06T 7/37* (2017.01); *G02B 26/02* (2013.01); *G06T 7/32* (2017.01);
(Continued)

(58) Field of Classification Search
CPC combination set(s) only.
See application file for complete search history.

(56) References Cited

U.S. PATENT DOCUMENTS 4,764,891 A   8/1988  Grinberg et al.
5,327,286 A *  7/1994  Sampsell ......... G01N 21/95623
                                                 359/559
(Continued)

FOREIGN PATENT DOCUMENTS

CN    101630178      1/2010
DE    102004014658   7/2010
(Continued)

OTHER PUBLICATIONS

Optical image correlation with a binary sptail light modulator, Demetri Psaltis, Dec. 1984, Optical Engineering.*
(Continued)

*Primary Examiner* — Alex Liew
(74) *Attorney, Agent, or Firm* — Fish & Richardson P.C.

(57) ABSTRACT

An optical correlator includes a first spatial light modulator arranged to receive light from a light source and configured to selectively attenuate the light; a first focusing layer arranged to receive the selectively-attenuated light from the first spatial light modulator and configured to focus the selectively-attenuated light; a first spacer layer substantially transparent to the light from the light source, the first focusing layer being disposed on the first spacer layer; a second spatial light modulator arranged in a Fourier optical relationship with respect to the first spatial light modulator and configured to selectively attenuate the focused light from the first focusing layer to provide twice-attenuated light, the second spatial light modulator being disposed on the first spacer layer opposite the first focusing layer; a second spacer layer substantially transparent to the light from the light source, the second spatial light modulator being disposed on the second spacer layer and positioned between the first and second spacer layers; a second focusing layer disposed on the second spacer layer opposite the second spatial light modulator and arranged to receive light from the second spatial light modulator and configured to focus the twice-attenuated light to provide focused, twice-attenuated; and a sensor array arranged to receive light from the second focusing layer and configured to detect spatial intensity variations of the focused, twice-attenuated light.

29 Claims, 4 Drawing Sheets

(51) Int. Cl.
*G02B 26/02* (2006.01)
*G06T 7/32* (2017.01)

(52) U.S. Cl.
CPC ............... *G06T 2207/10148* (2013.01); *G06T 2207/10152* (2013.01); *G06T 2207/20056* (2013.01)

(56) References Cited

U.S. PATENT DOCUMENTS

| | | | |
|---|---|---|---|
| 5,544,252 A * | 8/1996 | Iwaki | G02B 7/36 359/561 |
| 5,600,485 A * | 2/1997 | Iwaki | G02F 1/135 359/561 |
| 6,424,729 B1 * | 7/2002 | Soon | G06K 9/00087 382/124 |
| 7,012,749 B1 | 3/2006 | Mendlovic et al. | |
| 8,285,138 B2 | 10/2012 | Lewin et al. | |
| 2002/0067535 A1 | 6/2002 | Trezza | |

FOREIGN PATENT DOCUMENTS

| | | |
|---|---|---|
| EP | 0215008 | 3/1991 |
| GB | 2219179 | 12/1989 |

OTHER PUBLICATIONS

Verber et al. "Pipelines polynomial processors implemented with integrated optical components," Applied Optics, 23(6), Mar. 1984, 5 pages.

\* cited by examiner

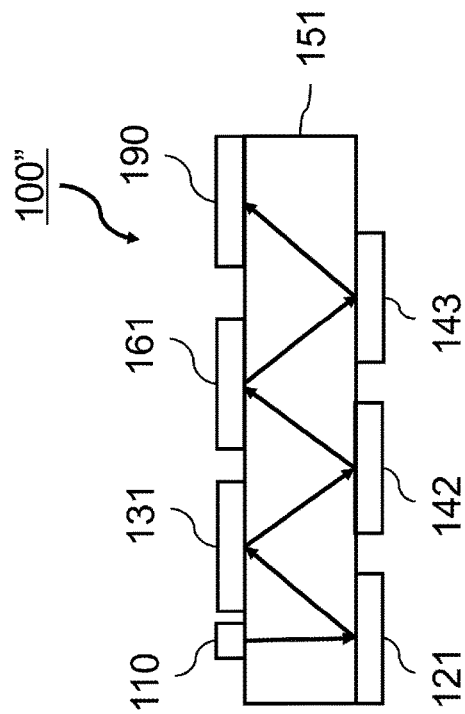
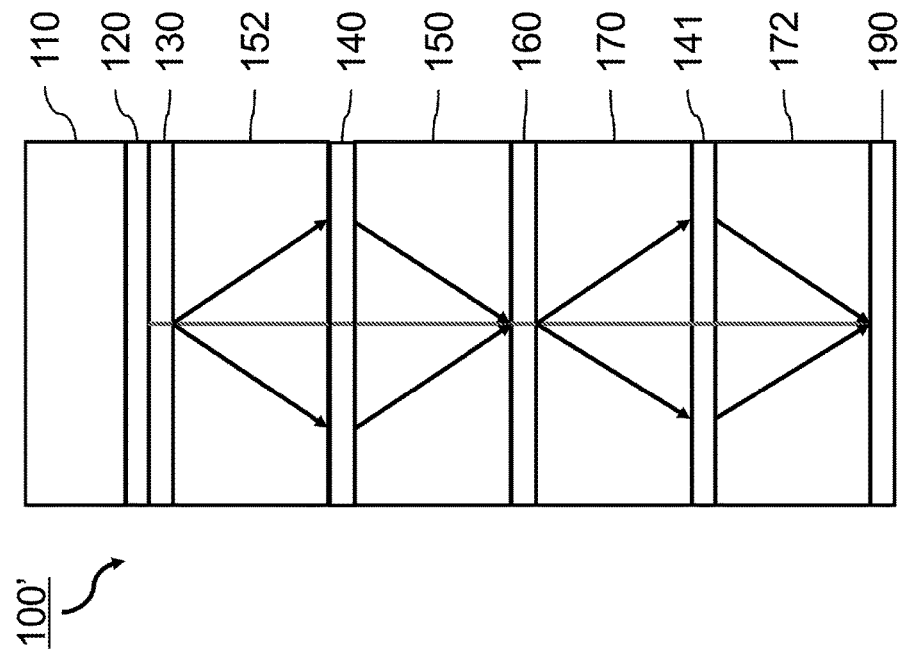
FIG. 1D
FIG. 1C

INTEGRATED OPTICAL CORRELATOR

TECHNICAL FIELD

This disclosure generally relates to optical correlators.

BACKGROUND

Optical correlators use the Fourier transform property of lenses to compare optical signals, such as to compare two images (or other two-dimensional signal) and correlating features in one image with features in the other. Implementing such a calculation in silicon (i.e. electronic computing) becomes increasingly expensive as the resolution increases. By contrast, the scaling of the optical correlator is more favorable, although for low resolution state-of-the-art silicon remains superior.

However, in many instances, optical correlators are composed of large, tabletop optical components, which are hand-assembled and aligned, expensive, sensitive to vibration, etc. The effective compute power per unit volume is quite low.

SUMMARY

This disclosure features optical correlator architectures achievable using wafer processing techniques, enabling compact, integrated form-factors and large-scale manufacturing in an economic manner. In contrast, conventional optical correlators typically rely on freespace or waveguide optics and tend to be bulky and expensive. Embodiments of the optical correlators are composed of a stack of planar, integrated layers including two spatial light modulators and a sensor. The first SLM is optically conjugate to the sensor and the second SLM is in a Fourier plane between the first SLM and the sensor. Optical power is provided by planar components, such as diffractive layers configured to focus incident light. The design is compatible with existing sensor and SLM technologies, meaning that very high resolution images may be processed using the disclosed devices. Accordingly, applications include image processing of high resolution images (e.g., for feature recognition) more efficiently than conventional image processing algorithms implemented using computer processors.

In general, in a first aspect, the invention features an optical correlator, including: a first spatial light modulator arranged to receive light from a light source and configured to selectively attenuate the light; a first focusing layer arranged to receive the selectively-attenuated light from the first spatial light modulator and configured to focus the selectively-attenuated light; a first spacer layer substantially transparent to the light from the light source, the first focusing layer being disposed on the first spacer layer; a second spatial light modulator arranged in a Fourier optical relationship with respect to the first spatial light modulator and configured to selectively attenuate the focused light from the first focusing layer to provide twice-attenuated light, the second spatial light modulator being disposed on the first spacer layer opposite the first focusing layer; a second spacer layer substantially transparent to the light from the light source, the second spatial light modulator being disposed on the second spacer layer and positioned between the first and second spacer layers; a second focusing layer disposed on the second spacer layer opposite the second spatial light modulator and arranged to receive light from the second spatial light modulator and configured to focus the twice-attenuated light to provide focused, twice-attenuated; and a sensor array arranged to receive light from the second focusing layer and configured to detect spatial intensity variations of the focused, twice-attenuated light.

Embodiments of the optical correlator can include one or more of the following features. For example, the optical correlator can include a third spacer layer substantially transparent to the light from the light source, the third spacer layer arranged between the first spatial light modulator and the first focusing layer. The optical correlator can also include a fourth spacer substantially transparent to the light from the light source, the fourth spacer layer arranged between the second focusing layer and the sensor array. Each of the spacer layers can be discrete layers from each other or two or more (e.g., all) of the spacer layers can be contiguous portions of a single layer of material. Where two or more of the spacer layers are a contiguous portions of a single layer of material, the first and second spatial light modulators can be reflective spatial light modulators disposed on a common surface of the single substrate. Moreover, the first and second focusing layers can be reflective focusing layers disposed on a surface of the single substrate opposite the first and second spatial light modulators.

The first focusing layer can have a focal length, $f_1$, and the first spacer layer can have a thickness such that the second spatial light modulator is positioned at a Fourier optical plane with respect to the first spatial light modulator. The Fourier optical plane with respect to the first spatial light modulator can be an optical distance $f_1$ from the first spatial light modulator. The second focusing layer can have a focal length, $f_2$, and the second spacer layer can have a thickness such that the sensor is positioned at a Fourier optical plane with respect to the second spatial light modulator. The Fourier optical plane with respect to the second spatial light modulator can be an optical distance $f_2$ with respect to the second spatial light modulator. In some embodiments, $f_1=f_2$.

The light source can be integrated with the optical correlator. The light source can be a laser light source, e.g., that includes a diode laser.

In some embodiments, the light source is remote from the optical correlator.

The first and second spatial light modulators can each modulate light in two orthogonal dimensions. The first and second spatial light modulators can be electrically addressed Spatial Light Modulators (EASLMs). The first and second spatial light modulators can be liquid crystal spatial light modulators or micromirror arrays.

Either or both of the first and second focusing layers can include a corresponding grating which focuses light by diffraction. In some embodiments, either or both of the first and second focusing layers include a corresponding element which focuses light by refraction or reflection.

The optical correlator can include an optical element positioned between the light source and the first spatial light modulator, the optical element being configured to substantially collimate light from the light source so that the first spatial light modulator receives substantially collimated light.

The sensor array can be a charge-coupled device (CCD) array, a photodiode array, or a complementary metal-oxide-semiconductor (CMOS) array.

The first and second spatial light modulators, the sensor array, and the first and second focusing layers can be arranged as a 4f optical correlator.

In a further aspect, the invention features a system that includes the optical correlator and a computer controller in communication with the sensor array, the electronic control module being programmed to receive signals from the sensor array and to process the signals to retrieve information encoded in the light received by the sensor array.

The computer controller can be in communication with the first spatial light modulator and programmed to vary the selective attenuation of light by the first spatial light modulator to generate an input image. The computer controller can be in communication with the second spatial light modulator and programmed to vary the selective attenuation of light by the second spatial light modulator to filter the input image. The computer controller can be programmed to process the signals to determine information about the input image based on the filtered image detected at the sensor.

In some embodiments, the system includes one or more additional optical correlators each comprising a sensor array, the electronic control module being in communication with each of the sensor arrays of the one or more additional optical correlators.

Among other advantages, the optical correlator architectures described herein can be embodied in compact, rugged form factors using conventional manufacturing techniques suitable for high volume production.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 1C is a cross-sectional view of another embodiment of an optical correlator;

FIG. 1D is a cross-sectional view of yet another embodiment of an optical correlator;

Like reference numbers and designations in the various drawings indicate like elements.

DETAILED DESCRIPTION

Figure 1B:
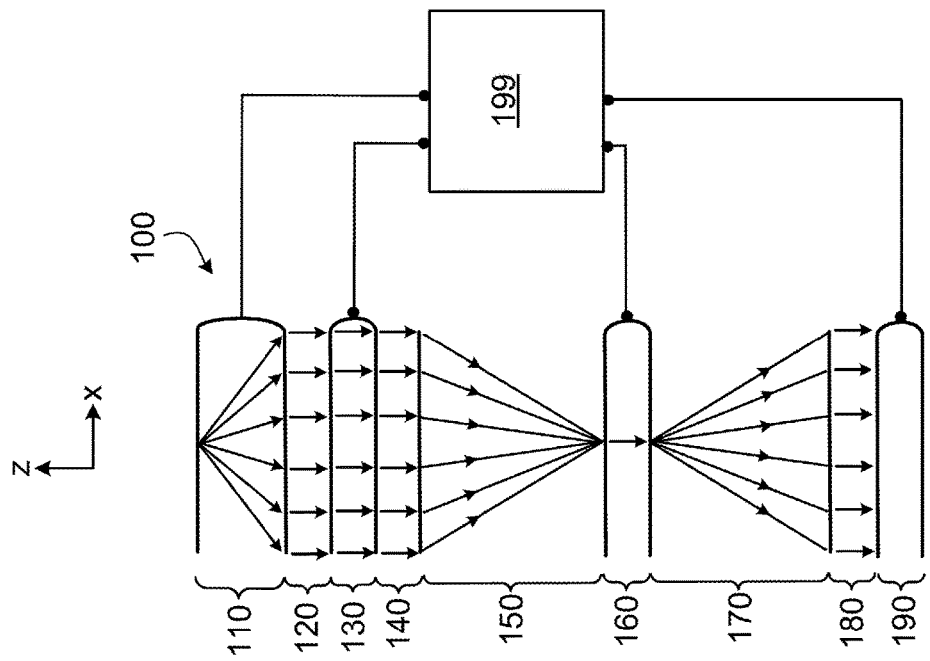
FIG. 1A and FIG. 1B are perspective and cross-sectional schematic view of an embodiment of an optical correlator.
Figure 1A:
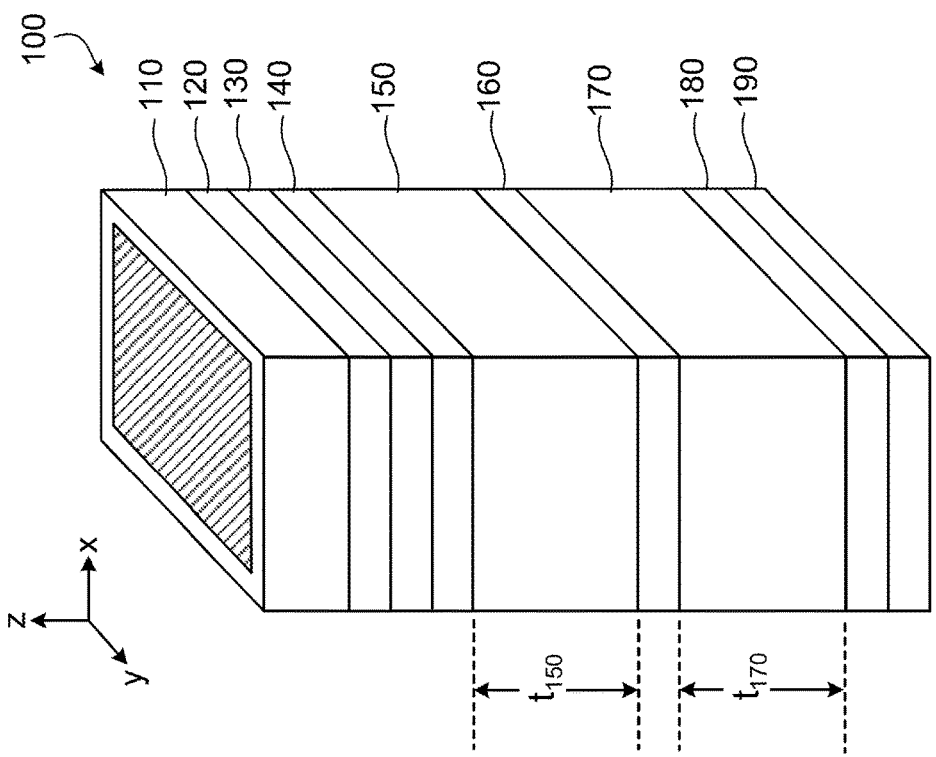

Referring to FIGS. 1A and 1B, an optical correlator 100 includes a light source 110, two spatial light modulators (SLMs) 130 and 160, and a sensor array 190. Optical correlator 100 further includes a collimating layer 120 between light source 110 and the first SLM 130, a focusing layer 140 between SLM 130 and second SLM 160, and a further collimating layer 180 between SLM 160 and sensor 190. A first spacer layer 150 separates first SLM 130 and second SLM 160, and a second spacer layer 170 separates second SLM 160 and sensor 190. All of the elements are bonded together to provide a compact, integrated package. Cartesian axes are shown for ease of reference. In this regard, an object's thickness refers to the object's dimension as measured along z-axis. An object's lateral area refers to the object's area in the x-y plane. "Top" and "bottom" refer to the +z and −z directions, respectively. For example, the top surface of device 100 refers to the surface facing in the +z direction, while the bottom surface refers to the opposite surface. As depicted in FIG. 1A, each of the component layers composing optical correlator 100 share the same lateral footprint, allowing the integrated correlator to have the form of a monolithic box-shaped device.

Light source 110 can be any light source with a form factor compatible with the other components of optical correlator 100 capable of emitting coherent light. In embodiments, light source 110 is a laser, such as a diode laser (e.g., double heterostructure lasers, quantum well lasers, vertical cavity surface emitting lasers (VCSELs), etc.). In general, the light source is configured to emit light in the −z direction, toward the other component layers of optical correlator 100. In general, light source 110 is configured to provide substantially monochromatic light. Implementations at UV (e.g., 200 nm to 380 nm), visible (380 nm to 780 nm), and IR (780 nm to 2,000 nm or more) wavelengths are possible. In each case, components of the device are selected to have the requisite functionality at the selected operational wavelength.

Collimating layers 120 and 180 and focusing layer 140 provide positive optical power to transmit and focus incident light from light source 110. Collimating layers are simply focusing layers arranged to collimate light as it propagates through optical correlator 100. Generally, the optical power can be provided by refractive or diffractive structures. For example, layers 120, 140, and/or 180 can be in the form of a Fresnel lens for focus light by refraction. Alternatively, one or more of these layers can include a grating structure which focuses light by diffraction. In certain embodiments, layers 120, 140, and/or 180 can include a single layered structure which focuses light in two dimensions (e.g., x and y). Alternatively, one or more of these layers can include two stacked structures, each for focusing the light in orthogonal directions. For example, in some embodiments, one or more of the layers includes a first one-dimensional grating for focusing light in x, and a second one-dimensional grating for focusing in y. In some embodiments, layers 120, 140, and 180 all have the same structure.

Spacer layers 150 and 170, with thicknesses $t_{150}$ and $t_{170}$, respectively, are formed from a material or materials that are substantially transparent to the operational wavelength of the device, have sufficient mechanical strength to support the other components of correlator 100, and have mechanical and chemical properties compatible with the techniques used to manufacture correlator 100. In some embodiments, spacer layers 150 and 170 are formed from silicon (e.g., crystalline, polycrystalline, or amorphous silicon). Silicon is substantially transparent to infrared light with wavelengths above about 1.1 microns, for example. In some implementations, spacer layers 150 and 170 are is formed from a material substantially transparent to optical wavelengths, such as glass or plastics commonly used in for liquid crystal displays.

In general, the thickness of spacer layers $t_{150}$ and $t_{170}$ and the focal length of each of layers 120, 140, and 180 are selected so that SLM 160 is positioned in a Fourier optical plane with respect to SLM 130, and so that sensor 190 is positioned in a Fourier optical plane with respect to SLM 160. Accordingly, sensor 190 is positioned at an optically conjugate plane with respect to SLM 130.

Spacer layer thicknesses $t_{150}$ and $t_{170}$ can be 0.5 mm or more (e.g., 1 mm or more, 5 mm or more, 10 mm or more, 20 mm or more, such as up to about 5 cm or even 10 cm).

SLM 130 and SLM 160 are both pixelated devices, composed of an array of switchable elements each capable of modulating the intensity of light incident at the pixel. The SLMs can have 100s or 1000s of pixels in the x- and y-directions.

SLM 130 and SLM 160 are transmissive SLMs, meaning that they modulate light by varying the amount of light transmitted from one side of the SLM to the other. Typically, electrically-addressable SLMs (EASLMs) are used. A variety of different suitable EASLMs exist, including liquid crystal (LC) SLMs, such those that utilize a nematic or ferroelectric LC material to modulate the polarization state of transmitted light. Typically, the LC layer is sandwiched between a pair of linear polarizers, and the incident light intensity field is modulated by varying the polarization state incident at the second (i.e., exit) polarizer.

Sensor 190 is an imaging sensor, such as a CCD array, a photodiode array, or a CMOS array. In general, any imaging sensor that has sufficient sensitivity at the device's operational wavelength, sufficiently high pixel count (e.g., 0.1 megaPixels (MP) or more, 0.5 MP or more, 1 MP or more, 2 MP or more, 3 MP or more, 5 MP or more, 10 MP or more), and appropriate footprint (e.g., a rectangular footprint with a diagonal of 1 cm or more, 2 cm or more, 3 cm or more, 4 cm or more, 5 cm or more) may be used.

A computer controller 199, shown in FIG. 1B, is connected to the active layers (i.e., light source 110, SLM 130, SLM 160, and sensor 190) of optical correlator 100 and controls and coordinates, via control signals, the operation of each layer. In some embodiments, electrical contacts for the SLM pixels are accessed by vias, which penetrate one or more of the other layers. In this way, all electrical contacts for operating the active layers of optical correlator 100 can be accessed from one side of the device, such as the top surface adjacent light source 110 or from the bottom surface adjacent sensor array 190.

During operation, computer controller 199 causes light source 110 to emit coherent light, propagating in the −z direction. Collimating layer 120 collimates the light prior, directing the light to illuminate first SLM 130. This SLM modulates the light it transmits, encoding the light with information in two dimensions. This can be in the form of a two-dimensional image. Focusing layer 140 focuses the light, through spacer 150 onto SLM 160. The thickness of spacer 150, $t_{150}$, is chosen to position SLM 160 at an optical distance $f_1$ behind focusing layer 140 so that the focusing layer produces a Fourier transform of the two dimensional light field at SLM 160.

SLM 160 serves as a programmable filter for optical correlator 100, selectively attenuating the intensity pattern of transmitted light to provide light that is now twice attenuated. This light propagates through spacer 170 to collimating layer 180, which collimates the incident light, transmitting it to sensor 190. Collimating layer 180 has a focal length, $f_2$, and spacer layer 170 has a thickness $t_{170}$ such that sensor 190 is positioned at a Fourier optical plane with respect to the SLM 160. For example, the Fourier optical plane with respect to the SLM 160 can be an optical distance $f_2$ behind SLM 160. In some embodiments, $f_i=f_2$.

Optical correlator 100 performs optical computations based on the convolution theorem from Fourier transform theory, which states that convolution in the spatial (x,y) domain is equivalent to direct multiplication in the spatial frequency ($k_x$, $k_y$) domain. Collimating layer 120 illuminates SLM 130 with a plane wave. Computer controller 199 delivers input signals to SLM 130, causing the SLM to modulate the plane wave according to a 2D function, f(x,y), encoding the plane wave with information. In some cases, the modulation corresponds to a physical image, although other modulations are also possible. The modulated illumination field is considered the input to the optical correlator and may include both intensity and phase modulations. The resulting modulated wavefront can be considered, mathematically, a spectrum of plane waves corresponding to the Fourier Transform (FT) of a transmittance function (i.e., the modulation introduced by SLM 130). Focusing layer 140 acts to transform the modulated intensity distribution from SLM 130 to the Fourier spectrum on layer 160. In other words, the spatial location of the image at SLM 160 correspond to different frequency components of f(x,y), the modulation introduced by SLM 130. Accordingly, selective attenuation of the this image by SLM 160 operates to filter out certain frequency components of the modulation introduced by SLM 130. Mathematically, SLM 160 can be considered to apply a transmission mask containing the FT of a second function, g(x,y), causing the transmission through SLM 160 to be equal to the product, $F(k_x,k_y) \times G(k_x,k_y)$. In practical applications, g(x,y) is some type of feature which must be identified and located within the input plane field. In some applications, for example, the input field can be an image and the feature to be identified may be a vehicle, a person, or some other object which must be quickly identified within some more complex scene that is imaged. In combination with focusing layer 140, collimating layer 180 places sensor 190 in optical conjugation with SLM 130, effectively forming an image of the convolution of f(x,y) and g(x,y)) on sensor 190 (sometimes with phase shifts or reflection, depending on the layout of the optical system).

Computer controller 199 can dynamically vary both the input SLM and the filter SLM at rates corresponding to the modulation rates of the SLMs (e.g., 100 Hz to 1,000 Hz), allowing the optical correlator to perform many different computations each second.

While FIGS. 1A and 1B show a specific architecture, other designs are also possible. For example, integrated optical integrators can include additional component layers in addition to those shown. In some embodiments, additional spacer layers can be used. For example, an additional spacer layer can be positioned between light source 110 and collimating layer 120. Alternatively, or additionally, an additional spacer layer can be positioned be positioned between SLM 130 and focusing layer 140, e.g., so that SLM 130 is an optical distance $f_1$ from focusing layer 140. In some embodiments, collimating layer 180 can be replaced by an additional focusing layer, and an additional spacer layer can be included between this focusing layer and sensor array 190. For instance, in some embodiments, an integrated optical correlator can be configured as a 4f optical integrator, in which a two SLMs and two focusing layers with the same focal length are used. Such a configuration is shown in FIG. 1C, where an integrated optical correlator 100' includes additional spacer layers 152 and 172. Here, first SLM 130 at the input plane is positioned one focal length in front of first focusing layer 140. Second SLM 160 is positioned one focal length behind first focusing layer 140 and one focal length in front of a second focusing layer 141. econd focusing layer 141 is positioned one focal length in front of sensor array 190 (see, e.g., https://en.wikipedia.org/wiki/Fourier_optics#4F_Correlator).

Furthermore, while the foregoing embodiments feature transmissive optical layers, other configurations are also possible. For example, reflective optical layers can be used. Referring to FIG. 1D, an integrated optical correlator 100" includes reflective optical elements arranged on opposing sides of a single spacer layer 151. Specifically, light source 110, reflective SLMs 131 and 161 (e.g., micromirror arrays or reflective LC SLMs, such as LC on Silicon SLMs), and sensor array 190 are arranged on the top surface of spacer layer 151, while a collimator 121 and two reflective focusing layers 142 and 143 (e.g., reflective gratings or Fresnel mirrors) are arranged on the bottom surface. Light from light source 110 enters spacer layer 151 through the top surface, traverses the spacer layer and is reflected and collimated by collimator 121. The collimated light traverses the spacer layer a second time, propagating from the bottom surface to the top, where it is reflected and modulated by SLM 131. The modulated light again traverses spacer layer 151, from top to bottom, where it is incident on reflective focusing layer 142. The focused light traverses the spacer layer, bottom to top, where it is incident on reflective SLM 161. This SLM reflects the light and modulates it a second time. The twice modulated light again traverses the spacer layer from top to bottom, is reflected by reflective focusing layer 143, after which it traverses the spacer layer a final time before being collected at sensor array 190. In this configuration, SLMs 131 and 161 operate in a corresponding manner to SLMs 130 and 160, described above. Similarly, collimating layer 121 and reflective focusing layers 142 and 143 perform corresponding optical functions to collimator 120, focusing layer 140, and focusing layer 141, respectively.

In general, the optical correlators described above can be manufactured using techniques commonly used in semiconductor device manufacturing, specifically wafer or LCD processing techniques. For example, the component portions of optical correlators can be formed by sequentially depositing layers of material onto a substrate layer and patterning each layer as necessary. Layer deposition can be performed using a variety of techniques, depending on the nature of the layer being formed (e.g., the material, thickness, crystallinity, etc.) and the nature of the underlying surface on which the layer is formed. Exemplary deposition techniques include physical vapor deposition (PVD), chemical vapor deposition (CVD), electrochemical deposition (ECD), molecular beam epitaxy (MBE) and atomic layer deposition (ALD).

Layer patterning is commonly performed using lithographic techniques, in which a pattern is transferred to a resist layer and a subsequent etch step transfers the pattern from the resist layer to an overlying or underlying layer of material. The initial patterning of the resist layer can be performed using photolithography or imprint lithography, for example. Wet, dry, and/or plasma etching can be used to remove material. Polishing processes (e.g., chemical mechanical polishing) can be used to planarize exposed surfaces.

In some cases, the light source, SLMs, and sensor can each be formed on a separate substrate during separate manufacturing processes and bonded together in a subsequent step to provide the integrated optical correlator. Spacer layers can serve as the substrates on which active layers are formed. Alternatively, or additionally, each active layer can be formed separately and then bonded to corresponding spacer layers subsequently. Such approaches may be desirable where particularly thick spacer layers are needed (e.g., where the spacer layers are 1 cm or more thick, such as 2 cm or more, 3 cm or more). Such approaches may also be desirable where different components are manufactured by different vendors.

Wafer processing techniques can also be used to form multiple devices on a single wafer, which is then diced to yield individual laser devices.

The integrated optical correlators may be further packaged to provide a robust component that can be readily integrated into larger systems, e.g., by integration onto printed circuit boards. Chip packaging techniques conventionally used for packaging integrated circuits, LEDs, and diode lasers can be used.

In the preceding embodiments, the light source is integrated with other active components of the optical correlator. However, other implementations are also possible. For example, in some embodiments, the light source is located remote from the other active components of the integrated optical correlator. Such arrangements be beneficial, particularly in avoiding unwanted heating of the optical correlator by the light source or power electronics components associated with the light source.

Figure 2:
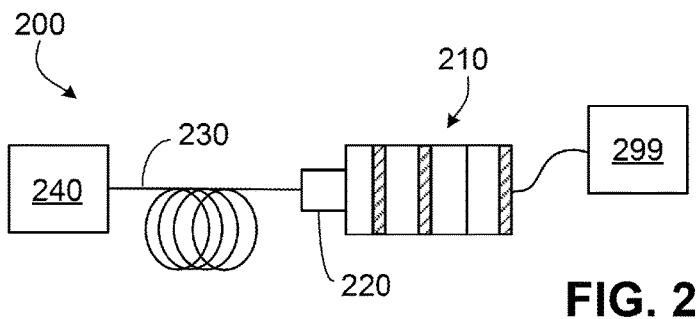
FIG. 2 is a schematic view of still another embodiment of an optical correlator.

An example of a system that includes an optical integrator with a remote light source as shown in FIG. 2. Here, a system 200 includes an integrated optical correlator 210 that is connected to an electronic control module 299. A remote light source 240, e.g., a laser, is located remote from optical correlator 210. An optical fiber 230 connects light source 240 to optical integrator 210 via a connector 220 and delivers light to the correlator. In some implementations, electronic control module 299 is also in communication with light source 240 and coordinates delivery of light to optical correlator 210 as well as programming of the correlator SLM's and processing electrical signals from the correlator's sensor.

Figure 3:
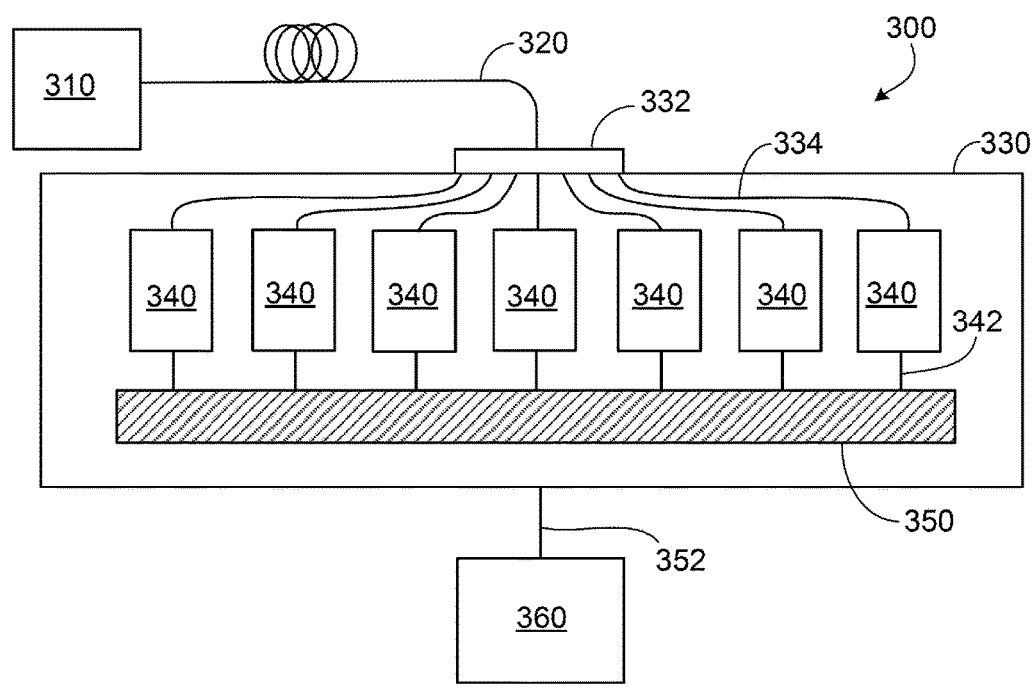
FIG. 3 is a schematic view of a system that incorporates multiple optical correlators.

The compact form factor of the optical correlators described above allow for compact systems containing multiple correlators. For example, referring to FIG. 3, an optical computation system 300 includes a light source 310, an optical correlator module 330, and a user interface 360. Optical correlator module 330 includes multiple integrated optical correlators 340, similar to those described above. Each correlator 340 is in communication with a computer controller 350, housed with the correlators in housing 330.

During operation, light source 310 delivers light to housing 330 via an optical fiber 320. A coupler/splitter 332 provides a port in housing 330 and receives light from from fiber 320. Coupler/splitter 332 splits the light into a number of channels, each corresponding to one of correlators 340. Optical fibers 334, corresponding to each channel, deliver light from coupler/splitter 332 to each correlator 340.

Under control of computer controller 350 (via electrical connections 342), optical correlators 340 each perform a series of optical calculations in parallel. A user interacts with optical correlator module 330 via user interface 360, which is connected to the optical correlator module 340 via cable 352. The connection allows a user to deliver, e.g., input information for processing, filter information, and/or receive output information from computer controller 350.

While user interface 360 is connected to the optical correlator module by a cable, wireless or more elaborate networked connections are also possible. For instance, module 330 can be part a server that is part of a larger server farm, accessible to users via a WAN.

Optical computation system 300 features several correlators configured to process in parallel. Other configurations are also possible. For example, in some embodiments, multiple correlators can be arranged in series, so that the output from one correlator becomes the input for a second correlator. Fan-out configurations are also possible, where the output from two or more correlators are combined as the input for a further correlator or, vice-versa, where the output from one correlator becomes the input for two or more parallel correlators. In either case, multiple serial computation layers are possible (e.g., 2, 3, 4, 5, 6 or more).

Some aspects of the integrated optical correlators and systems containing these devices described here can be implemented in digital electronic circuitry, or in computer software, firmware, or hardware, including the structures disclosed in this specification and their structural equivalents, or in combinations of one or more of them. For example, in some implementations, the computer controller 199 can be implemented using digital electronic circuitry, or in computer software, firmware, or hardware, or in combinations of one or more of them.

The term "computer controller" encompasses all kinds of apparatus, devices, and machines for processing data and/or control signal generation, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes described above can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks , and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computing system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 4:
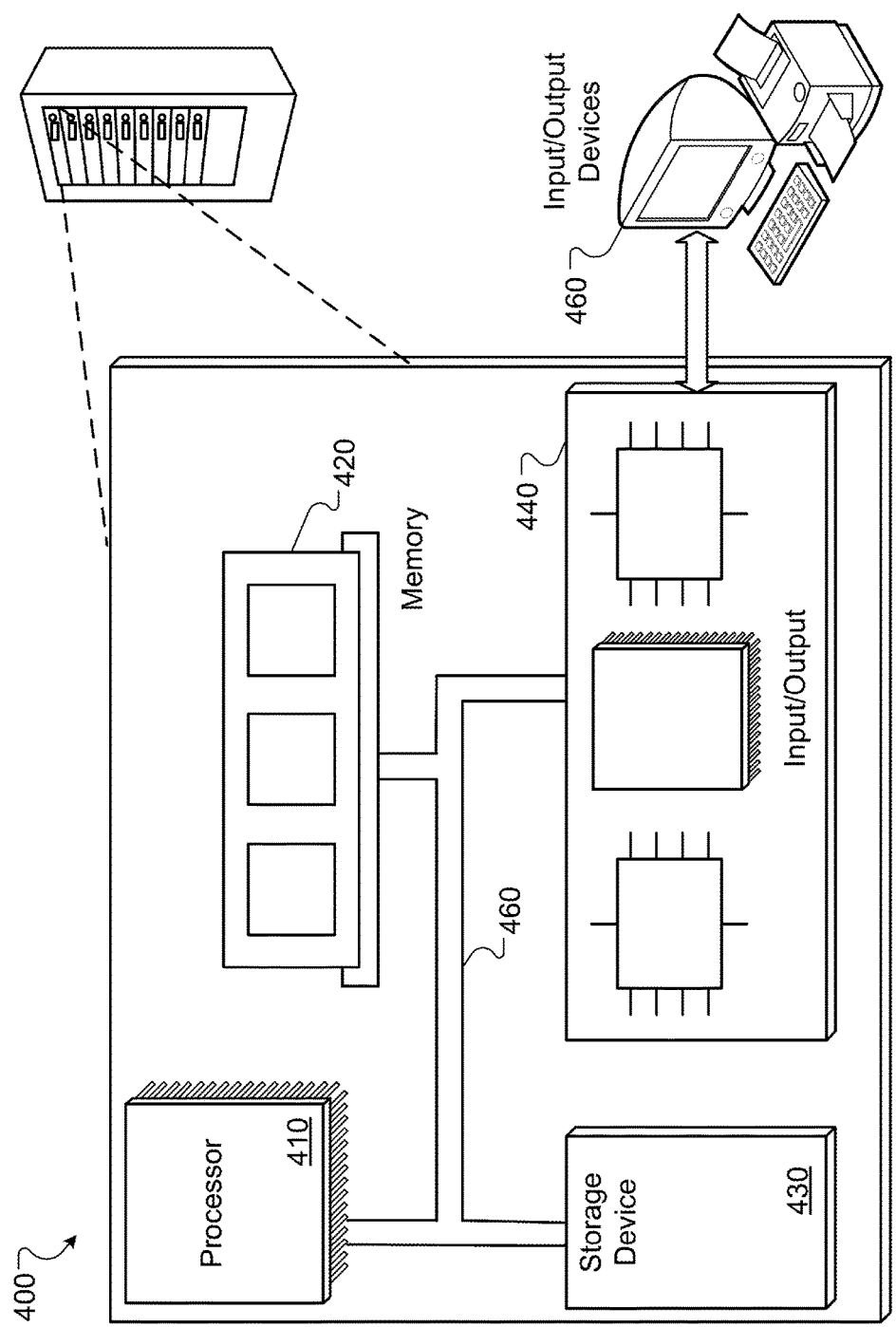
FIG. 4 shows an example computer system for controlling an optical correlator.

FIG. 4 shows an example computing system 400 that includes a processor 410, a memory 420, a storage device 430 and an input/output device 440. Each of the components 410, 420, 430 and 440 can be interconnected, for example, by a system bus 450. The processor 410 is capable of processing instructions for execution within the system 700. In some implementations, the processor 410 is a single-threaded processor, a multi-threaded processor, or another type of processor. The processor 410 is capable of processing instructions stored in the memory 420 or on the storage device 430. The memory 420 and the storage device 430 can store information within the system 400.

The input/output device 440 provides input/output operations for the system 400. In some implementations, the input/output device 440 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 460. In some implementations, mobile computing devices, mobile communication devices, and other devices can be used.

A number of embodiments have been described. Nevertheless, it will be understood that various modifications may be made without departing from the spirit and scope of the invention. Accordingly, other embodiments are within the scope of the claims.

What is claimed is:
1. An optical correlator, comprising:
  a first spatial light modulator arranged to receive light from a light source and configured to selectively attenuate the light;

a first focusing layer arranged to receive the selectively-attenuated light from the first spatial light modulator and configured to focus the selectively-attenuated light;

a first spacer layer substantially transparent to the light from the light source, the first focusing layer being disposed on the first spacer layer;

a second spatial light modulator arranged in a Fourier optical relationship with respect to the first spatial light modulator and configured to selectively attenuate the focused light from the first focusing layer to provide twice-attenuated light, the second spatial light modulator being disposed on the first spacer layer opposite the first focusing layer;

a second spacer layer substantially transparent to the light from the light source, the second spatial light modulator being disposed on the second spacer layer and positioned between the first and second spacer layers;

a second focusing layer disposed on the second spacer layer opposite the second spatial light modulator and arranged to receive light from the second spatial light modulator and configured to focus the twice-attenuated light to provide focused, twice-attenuated light; and a sensor array arranged to receive light from the second focusing layer and configured to detect spatial intensity variations of the focused, twice-attenuated light.

2. The optical correlator of claim 1, further comprising a third spacer layer substantially transparent to the light from the light source, the third spacer layer arranged between the first spatial light modulator and the first focusing layer.

3. The optical correlator of claim 2, further comprising a fourth spacer layer substantially transparent to the light from the light source, the fourth spacer layer arranged between the second focusing layer and the sensor array.

4. The optical correlator of claim 3, wherein each of the spacer layers are discrete layers from each other.

5. The optical correlator of claim 3, wherein the first, second, third, and fourth spacer layers are contiguous portions of a single layer of material.

6. The optical correlator of claim 5, wherein the first and second spatial light modulators are reflective spatial light modulators disposed on a common surface of the single layer of material.

7. The optical correlator of claim 6, wherein the first and second focusing layers are reflective focusing layers disposed on a surface of the single layer of material opposite the first and second spatial light modulators.

8. The optical correlator of claim 1, wherein the first focusing layer has a focal length, $f_1$, and the first spacer layer has a thickness such that the second spatial light modulator is positioned at a Fourier optical plane with respect to the first spatial light modulator.

9. The optical correlator of claim 8, wherein the Fourier optical plane with respect to the first spatial light modulator is an optical distance $f_1$ from the first spatial light modulator.

10. The optical correlator of claim 8, wherein the second focusing layer has a focal length, $f_2$, and the second spacer layer has a thickness such that the sensor array is positioned at a Fourier optical plane with respect to the second spatial light modulator.

11. The optical correlator of claim 10, wherein the Fourier optical plane with respect to the second spatial light modulator is an optical distance $f_2$ with respect to the second spatial light modulator.

12. The optical correlator of claim 10, wherein $f_1=f_2$.

13. The optical correlator of claim 1, wherein the light source is integrated with the optical correlator.

14. The optical correlator of claim 1, wherein the light source is a laser light source.

15. The optical correlator of claim 14, wherein the laser light source comprises a diode laser.

16. The optical correlator of claim 1, wherein the light source is remote from the optical correlator.

17. The optical correlator of claim 1, wherein the first and second spatial light modulators each modulate light in two orthogonal dimensions.

18. The optical correlator of claim 1, wherein the first and second spatial light modulators are electrically addressed Spatial Light Modulators (EASLMs).

19. The optical correlator of claim 1, wherein the first and second spatial light modulators are liquid crystal spatial light modulators or micromirror arrays.

20. The optical correlator of claim 1, wherein either or both of the first and second focusing layers comprise a corresponding grating which focuses light by diffraction.

21. The optical correlator of claim 1, wherein either or both of the first and second focusing layers comprise a corresponding element which focuses light by refraction or reflection.

22. The optical correlator of claim 1, further comprising an optical element positioned between the light source and the first spatial light modulator, the optical element being configured to substantially collimate light from the light source so that the first spatial light modulator receives substantially collimated light.

23. The optical correlator of claim 1, wherein the sensor array is a charge-coupled device (CCD) array, a photodiode array, or a complementary metal-oxide-semiconductor (CMOS) array.

24. The optical correlator of claim 1, wherein the first and second spatial light modulators, the sensor array, and the first and second focusing layers are arranged as a 4f optical correlator.

25. A system, comprising:
the optical correlator of claim 1; and
a computer controller in communication with the sensor array, the computer controller being programmed to receive signals from the sensor array and to process the signals to retrieve information encoded in the light received by the sensor array.

26. The system of claim 25, wherein the computer controller is in communication with the first spatial light modulator and programmed to vary the selective attenuation of light by the first spatial light modulator to generate an input image.

27. The system of claim 26, wherein the computer controller is in communication with the second spatial light modulator and programmed to vary the selective attenuation of light by the second spatial light modulator to filter the input image.

28. The system of claim 27, wherein the computer controller is programmed to process the signals to determine information about the input image based on the filtered image detected at the sensor array.

29. The system of claim 25, further comprising one or more additional optical correlators each comprising a sensor array, the computer controller being in communication with each of the sensor arrays of the one or more additional optical correlators.

* * * * *